Patented July 13, 1926.

1,592,599

UNITED STATES PATENT OFFICE.

CHARLES B. DAVIS, OF NEW YORK, N. Y.

SYNTHETIC BONE CHAR AND METHOD OF PRODUCING SAME.

No Drawing. Application filed May 12, 1923. Serial No. 638,669.

My invention is the result of experimental investigation undertaken to effect the production, by synthesis, of a practical and economic substitute for the "bone char", so called, heretofore used in the refining of sugar, and for analogous purposes and processes of decolorization generally.

As is well known in the art, in the ordinary process of refining sugar the impure syrup adhering to the crystals is removed by mixing the raw sugar with water, or a low grade run of syrup, and then spinning the resulting magma in a centrifugal machine, by which procedure the raw sugar is separated into washed sugar which remains in the centrifugal, and the wash liquor which is eliminated therefrom. This wash liquor is then usually reduced to a granular mass by boiling under vacuum, which granular mass is again subjected to centrifugal action resulting in a low grade "remelt" or brown sugar, and also in a syrup known as black-strap, and containing all the impurities of the raw product, such as albumins, gums, pectin, polyphenols, phenolcarboxylic acids, catechol, oxidases, chlorophyll, cane wax, fat, essential oils, resins, bacteria, yeasts, moulds, mineral salts, etc.

A feature of my invention is the utilization of this impure syrup containing the above mentioned impurities as a source of carbon to cover my synthetic bone structure, which is built up from a mixture of acid (mono) phosphate and fluoride of calcium and hydrate of calcium.

In carrying out my process of the manufacture of the equivalent of animal bone char (and by the term "bone char" as herein used I mean to designate such equivalent product) I prefer to use the commercial phosphate known as "super-phosphate of lime", since this contains the proper proportion of calcium fluoride in soluble form to produce a hardened bone-like substance similar to animal bone. On mixing the impure black-strap syrup above referred to with the proper quantity of acid phosphate and fluoride and hydrate of calcium, a "gel" is obtained which, on settling or filtration, carries all the impurities with it. After washing this gelatinous mass free of sugar with water it is dried and carbonized in char kilns from which air is excluded so as to avoid incineration and reduction to ash.

The "gel" intermixed with the sugar impurities (but washed clean of sugar proper) on charring produces the following results, to wit:—

1. The hydrated mono-phosphate and fluoride of calcium is rendered extremely porous by the decomposition of the gums, albumin, wax, resin, etc.

2. The wax and resins in contact with the slight alkalinity of the hydrated "gel", on decomposition and destructive distillation, yield substances which tend to harden the carbon constituent.

Incidental to the process it may be stated that the commercial acid phosphate is extracted with water and the soluble portion used, about forty pounds of the phosphate is added to approximately one ton of cold, low grade raw sugar washings or black-strap of about 60 Brix. The acidity is now neutralized with calcium hydrate to form the "gel" intermixed with the gums, wax, etc. This "gel" is now removed by filtration, washed free of all soluble sugar by means of warm water, and after drying is charred in kilns in the absence of air, as and for the reasons hereinbefore stated. The fluoride constituent acts also as an antiseptic and deodorizer, preventing the abnormal decomposition of the organic matter of the "gel", and also preventing any offensive odor on charring which would otherwise result.

To summarize, a practical exemplification of the process may, in other words, be stated as follows:—

Take 125 pounds of powdered commercial super-phosphate of lime, and extract the soluble matter by means of cold water. To the resultant solution, which will contain approximately forty pounds of soluble matter, is added a ton of black-strap or washings, which renders the admixture acid. The acid phosphates and fluorides are converted into a "gel" by the addition of hydrated lime in sufficient quantity to produce a slight alkaline reaction within the whole admixture. The "gel" now has entangled with it the gums, albumin, etc., while the sugar remains in solution. The "gel" is then filtered and washed to eliminate the sugar, and the resultant hydrated gel is a mixture of colloidal gelatinous mass and a liquid, becoming a solid gel only during the drying process and contains the constituents which build up the bone char structure, and also the organic constituents which on kilning produce the char by carbonization.

The char thus produced, after use for refining sugar, may be revivified as in the case of the ordinary animal bone char, by simply washing with water, dilute acid, or soda, either one or the other, or all three, and then drying and re-kilning.

Also, the "gel" may be first formed and then added to the sugar washing or blackstrap.

The blue-white sugar syrup obtained by the use of my synthetic bone char is free of ash or mineral constituents, and has a purity of 99.8 to 99.9% from washed raw sugar.

The carbon content of my synthetic char is from 8 to 10%, and may be increased or diminished at will by varying the proportion of "gel" or sugar washings; and such char has both color and ash (mineral constituent) absorbing and adsorbing qualities, and does not glaze over like animal bone char. Hence, my synthetic char, owing to its relatively higher degree of porosity as compared with animal bone char, resulting from its increase of absorbent capillary surface, exposed to the liquid to be decolorized, is more effective in function; and the cost of production of the synthetic bone char is very much less than that of animal bone char.

Another advantage attained by my synthetic bone char is that any dust formed incidentally in the use thereof need not necessarily be discarded, as in the case of animal bone char, but may be mixed with a new batch of "gel", in which event it becomes entangled with the "gel" and permanently fixed as related thereto on the charring of the mass.

It is to be understood that magnesium or other metal phosphate and fluoride might be substituted for calcium with like results.

The non-saccharine carbon natural to the sugar cane is devoid of all starchy cellulosic, hemi-cellulosic lignin carbon, and siliceous matter which tends to soften the resulting product and cause it to crumble.

The lime phosphoric filter-press-mud cake obtained from defecating the cane juice or raw cane sugar may be employed if first disinfected by hydrofluoric acid or soluble fluoride, and then converting this fluoride into a mineral "gel" compound in order to harden it, it being finally carbonized. In this way the product is still further cheapened, as the mud has heretofore been thrown away or used for fertilizing purposes for the past century,—said mud containing the non-saccharine organic matter natural to raw sugar.

It is to be distinctly understood that there are two mono-calcium phosphates, one with hydrofluoric acid and fluorides such as the commercial super-phosphate, and the other entirely free from fluorine compounds. The super-phosphate with fluorine is the type suitable for the bone structure I wish to obtain, and corresponds closely to that of animal bone ash.

When adding the dry super-phosphate and flouride of calcium to the raw sugar washing, the insoluble matter is allowed to deposit and is removed before forming the gel with the hydrate of lime.

As there is very little volatile matter to eliminate, only a faint red heat of about 500° C. is necessary to carbonize, which prevents over burning and fracture of the synthetic mineral bone structure,—and thus economizes fuel. Before drying and carbonizing the mass is entirely in the form of a gel.

Another distinctive feature of my invention is that I do not use bagasse or megasse, in my process since this material contains about 80 per cent of woody fibre or straw and would prevent the formation of a homogeneous gel.

Furthermore incidental to my preparation of synthetic bone char, my gel removes all the impurities, and over 90 per cent of the coloring matter from the blackstrap, and converts the sugar remaining in solution into a saleable golden syrup.

What I claim as my invention and desire to secure by Letters Patent is,

1. A carbonized mass obtained from decomposed non-saccharine, non-fibrous, non-starchy organic matter natural to raw sugar.

2. A carbonized mass made from a gel of non-saccharine, non-fibrous, non-starchy organic matter natural to raw sugar and having a mineral phosphate base.

3. A synthetic porous mineral phosphate and fluoride base having a chemical and physical composition similar to bone ash coated with the non-saccharine, non-fibrous, non-starchy organic impurities of raw sugar.

4. A synthetic porous mineral phosphate and fluoride base having a chemical and physical composition similar to bone ash coated with carbonized non-saccharine, non-fibrous, non-starchy organic impurities of raw cane sugar.

5. A synthetic decolorizing carbon obtained from carbonized non-saccharine, non-fibrous, non-starchy organic impurities of raw sugar.

6. A porous mineral phosphate and fluoride base coated with carbonized non-saccharine, non-fibrous, non-starchy organic impurities and hardened by carbonizing the synthetic bituminous constituents derived from the destructive distillation of oils, fats and resins natural to raw sugar.

7. The process herein set forth of producing a mineral phosphate and fluoride base consisting in mixing a mineral phosphate gel with a gel of non-saccharine, non-fibrous, non-starchy organic impurities of raw sugar, drying and carbonizing out of contact with air.

8. The process herein set forth of producing a carbonized mineral phosphate and fluoride, consisting in mixing a mineral phosphate and fluoride gel with a gel of non-saccharine, non-fibrous, non-starchy organic impurities of raw sugar, drying and carbonizing out of contact with air.

9. A carbonized mass obtained from a decomposed gel of non-saccharine, non-fibrous, non-starchy organic matter natural to raw sugar.

10. A carbonized mass consisting of decomposed non-saccharine, non-fibrous, non-starchy organic matter natural to raw sugar, and having a mineral phosphate base.

CHARLES B. DAVIS.